United States Patent
Wilson

(10) Patent No.: US 7,348,748 B2
(45) Date of Patent: Mar. 25, 2008

(54) MOTORIZED SYSTEM AND METHOD OF CONTROL

(75) Inventor: Curtis Wilson, Sherman Oaks, CA (US)

(73) Assignee: Delta Tau Data Systems, Inc., Chatsworth, CA (US)

( * ) Notice: Subject to any disclaimer, the term of this patent is extended or adjusted under 35 U.S.C. 154(b) by 166 days.

(21) Appl. No.: 11/446,249

(22) Filed: Jun. 2, 2006

(65) Prior Publication Data

US 2007/0278980 A1    Dec. 6, 2007

(51) Int. Cl.
*G05B 19/25* (2006.01)
(52) U.S. Cl. .................. 318/573; 318/567; 318/569
(58) Field of Classification Search .......... 318/567, 318/569, 573; 369/30.01
See application file for complete search history.

(56) References Cited

U.S. PATENT DOCUMENTS 4,477,754 A    10/1984  Roch et al.
2006/0072379 A1*  4/2006  Ochi ................. 369/30.01

* cited by examiner

*Primary Examiner*—Karen Masih
(74) *Attorney, Agent, or Firm*—Langlotz Patent Works, Inc.; Bennet K. Langlotz

(57) ABSTRACT

A system and method for generating a controlled motion path with a machine-tool system having a controller operating in a servo rate. The method includes a first interpolation step, in which a path segment corresponding to a number of servo update periods is calculated. After the first interpolation step, a speed override factor is established. After establishing the speed override factor a second interpolation step occurs, which includes calculating a number of path setpoints for each path segment. The number of servo update periods per path segment may vary over the path.

19 Claims, 9 Drawing Sheets

MOTORIZED SYSTEM AND METHOD OF CONTROL

FIELD OF THE INVENTION

This invention relates to computer controlled machine tools and other similar devices that provide automated motion or path control.

BACKGROUND AND SUMMARY OF THE INVENTION

In many path-based automatic positioning applications, such as computer numerically controlled (CNC) machining, the controller's commanded path-generation algorithms need to satisfy many user desires simultaneously. First, they must follow the desired path within a certain required positional accuracy. Second, where possible, they must follow this path at a programmed vector tool speed, or "feedrate" (the rate at which the material is fed into the tool, or at which the tool is moved through the material). Third, algorithms must keep the path traversal within the physical capabilities of the machine, usually expressed as limits on the higher time derivatives of motor position, particularly acceleration. Finally, in many systems, the operator must be given an interactive "feedrate override" capability to be able to adjust the speed manually and instantaneously without changing the part program. Typically this is done with a knob that sets the override as a percentage of the programmed feedrate, for the purpose of diagnosing machining problems at the prototype phase, in order to optimally program a system for production.

One problem with existing systems is that most implementations of acceleration and override control have significant adverse effects on the accuracy with which the generated commanded path matches the desired path description. This is particularly true of the traditional CNC methods. These effects were often tolerable at standard machining speeds and accuracies of the day, but become unacceptable at higher speeds and/or higher accuracy requirements. Many other techniques that mitigate these effects produce other undesirable effects, such as delays in responding to override changes.

Traditional CNC path generation algorithms create equations of commanded motion with respect to time for each programmed move "block" at the specified feedrate, constant through the programmed move. This leads to constant axis velocities for linearly interpolated moves, and sinusoidal axis velocities for circularly interpolated moves, in Cartesian systems.

These equations of motion for each axis are then solved every interpolation cycle (usually at the servo update rate) with an update of the time value to generate a series of commanded positions along the path at the commanded feedrate. ("Servo update" may also be described as a "position update".) Step changes in axis velocities are possible (and common) at move boundaries.

In the traditional CNC method, acceleration control is applied after interpolation with a causal (i.e., not using future information) low-pass filter. In an early CNC controller, this was implemented by applying a large time constant (e.g. several hundred milliseconds) in the analog velocity loop of the servo drives. In current existing systems it is more commonly implemented with a dynamically equivalent digital low-pass filter, usually first-order, acting on the numeric data streams for each axis coming out of the interpolator algorithm.

FIG. 1 shows a graph 100 of the resulting position-versus-time 102 and velocity-versus-time 104 profiles for a simple constant-speed move passed through a digital filter with a 100-msec time constant, in a prior art system.

For a first-order low-pass filter with a time-constant $T_f$, the steady-state path error for a path with radius R executed at velocity V is:

$$E_f = V^2 T_f^2 / 2R$$

At now-common speeds and time constants, the resulting errors can be significant. This effect is largely responsible for the machining lore that circles get smaller at high speeds. It is noteworthy that these are errors in the commanded path, and can occur well within the servo system's bandwidth; tracking errors of the servo loop as the bandwidth is exceeded can yield further errors.

FIG. 2 shows a graph 200 of the commanded path of two runs of a shape composed of lines and arcs, in a prior art system. The first run 202 is executed without any acceleration control, and so produces the desired path precisely (although in a physically unrealizable manner). It produces the sharp corners and the outer arc paths in the graph. The second run 204 repeats the profile, but with a digital low-pass filter with $T_f$=100 msec applied after the interpolation. This is a very large time constant for the speed and size in order to produce easily seen effects. The corners are rounded significantly (and asymmetrically) so they can be passed without slowing, and the arcs fail significantly to the inside due to the filtering.

Another prior art method of acceleration control is applied during the calculation of the commanded move equations, before interpolation. In a coordinated multi-axis application such as path-control machining, a common acceleration time must be used for all axes, even if the time is derived from a maximum rate of acceleration on one of the axes. FIG. 3 shows a graph 300 of the position-versus-time 302 and velocity-versus-time 304 profiles for the same basic move as in FIG. 1, but with a constant acceleration of 100-msec time (yielding the same maximum acceleration as in FIG. 1) applied before interpolation.

FIG. 4 shows a graph 400 of the same programmed path as in FIG. 2, with the first run 402 again going without acceleration control, but with the second run 404 utilizing a 100 msec acceleration time between moves applied before interpolation in a non-causal algorithm (using information about the subsequent trajectory). This method has the same peak accelerations as the method of FIG. 2, but the effect on path fidelity is much smaller. The corner rounding is much smaller, and the arcs do not fail to the inside. This method requires significantly more complex acceleration-calculation algorithms, particularly when applied to circular interpolation, but it does create superior path generation.

While the second method looks significantly superior, is it has some important disadvantages. First, it produces some undesirable effects when interactive feedrate override is used, as explained below. Second, it is more difficult in this method to apply acceleration control when the acceleration or deceleration must be applied over multiple programmed moves, such as when the moves are very small in complex contouring applications.

As explained above, interpolation in command-position generation involves repeated solutions of the move equations for each axis as the time value is incremented each interpolation cycle. Normally, the numerical increment of the time value matches the actual physical time elapsed. But with feedrate or speed override control, the numerical increment can deviate from the real time. For example, if 50% override is desired, the increment value used corresponds to half of the true time elapsed. Note that the physical time increment is not changed in this process, just the number used in the equations.

It is apparent what happens to constant-velocity moves in this process—the velocity varies linearly with the override value. However, if there are already acceleration profiles in the move equations, the acceleration also varies, and as the square of the override value.

FIG. 5 shows a graph 500 illustrating the effect of override when acceleration control is applied after interpolation, and therefore after override control. The same move is executed at 100% and 50% override, with the same acceleration time constant applied to both. The position-versus-time profile at the 100% override setting is indicated by line 502; the 50% override setting is indicated by line 504. Velocity-versus-time at 100% is indicated by line 506; velocity-versus-time at 50% is indicated by line 508. The acceleration time constant is unchanged with override, so the rate of acceleration varies linearly with override. If the acceleration time constant is set to provide maximum acceleration at 100% override, the acceleration limits will be exceeded at override values greater than 100% and reduced acceleration rates will be used at override values less than 100%. In addition, the commanded path on any curve will vary with the override value.

FIG. 6 shows a graph 600 illustrating the effect of override when acceleration control is applied before interpolation, and therefore before override control. The same move is executed at 100% and 50% override values, with the same acceleration time pre-calculated for both. The position-versus-time profile at the 100% override setting is indicated by line 602; the 50% override setting is indicated by line 604. Velocity-versus-time at 100% is indicated by line 606; velocity-versus-time at 50% is indicated by line 608.

The acceleration time varies inversely with override, and since velocity varies linearly with override, the rate of acceleration varies with the square of the override. (At 50% override, the acceleration to and from half the velocity takes twice as long, so the acceleration is only one-quarter of what it would be at 100% override.) This leads to substantially sub-optimum performance at low override values, and can lead to significant acceleration limit violations at override values greater than 100%, with the acceleration varying more widely with override than with the post-interpolation acceleration filter. However, because of this fact, when this style of acceleration control is used to blend path moves together at corners, the size and shape of the corners does not change with override values, a feature that many users value. Nonetheless, important disadvantages remain.

The present invention overcomes the limitations of the prior art by providing a system and method for generating a controlled motion path with a machine-tool system having a controller operating at a servo rate. The method includes a first (coarse) interpolation step, in which a path segment corresponding to a number of servo updates is calculated. At this first interpolation step, a speed override factor is established. After establishing the speed override factor, acceleration control can be applied to the segmented trajectory. Next, a second (fine) interpolation step occurs, which calculates every individual set point for each axis along the commanded path, usually incrementing at the servo update period. The number of servo update periods per path segment may vary over the path.

DETAILED DESCRIPTION OF A PREFERRED EMBODIMENT

A preferred embodiment of the invention incorporates a multiple-step process to generate a commanded path or trajectory with the desired properties from basic move descriptions, which are essentially defined by the nominally desired path to be followed by the tool. The term path is used to encompass both multi-dimensional and single dimensional patterns of motion or trajectorys.

Figure 8:
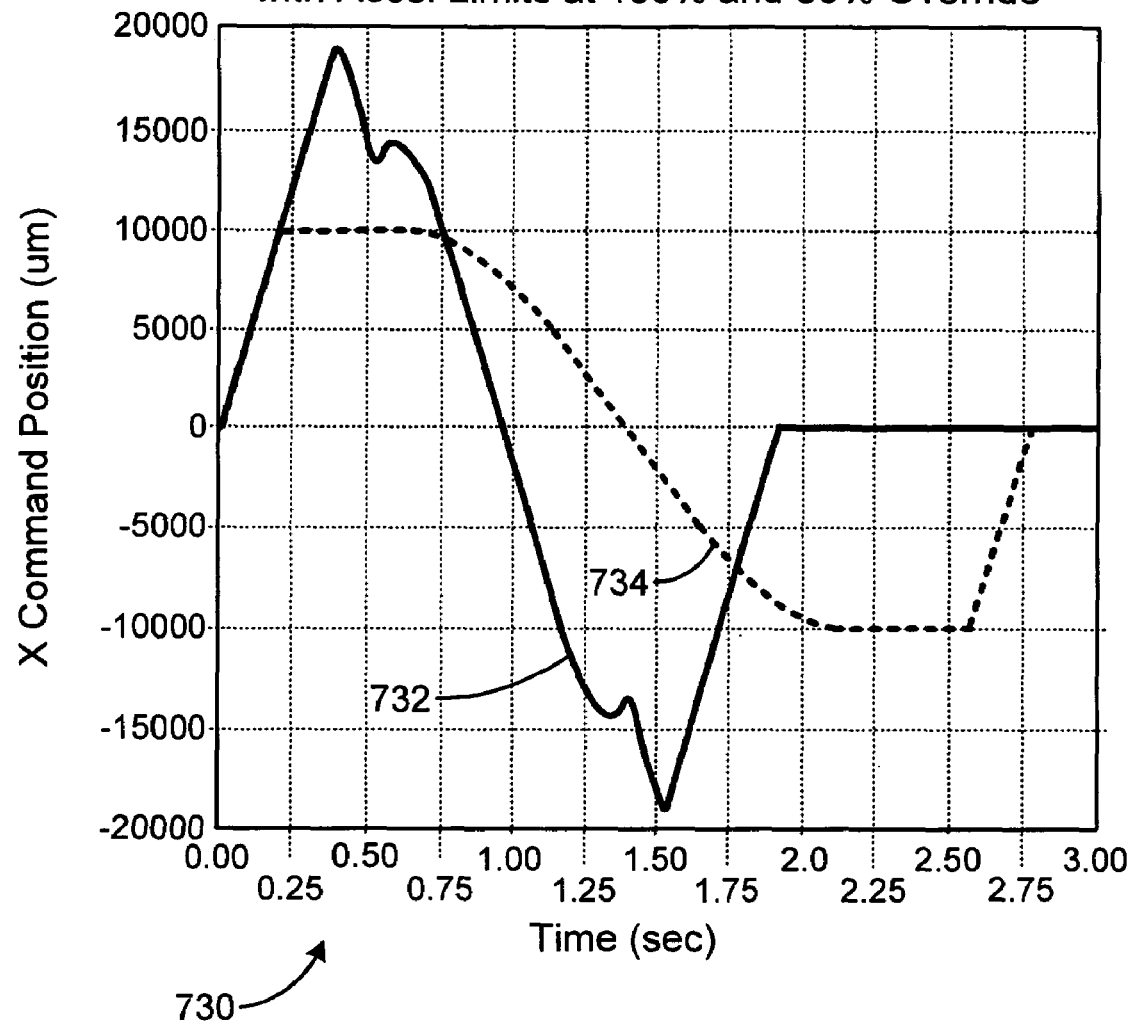
FIG. 8 is a graph illustrating operation of a preferred embodiment of the invention.

As shown in FIG. 8, the first step 710 reads a move description of each commanded move of the tool-tip relative to the workpiece and generates equations of motion for each axis consistent with the description. In CNC machining, moves are commonly described in RS-274 "G-codes", but many other methods are possible.

The second step 712 solves these equations at successive time intervals that are greater than the final setpoint-generation interval. This step is called "coarse interpolation". Each generated point has a location, velocity, acceleration, and higher derivative properties. Feedrate override control can be applied at this step by varying the time increment in the equations of the described move from the resulting time specified for the move segments between the coarsely interpolated points.

If determined to be required based in the application in decision step 713, an optional third step 714 can transform the coarsely interpolated tool-tip point coordinates and times to the coordinates of the underlying machine joints or actuators. This transformation is called the "inverse-kinematic" transformation. For a Cartesian mechanism such as a standard 3-axis (XYZ) CNC machining center, this transformation is basically a pass-through, with possible scaling and/or offset. However, for systems with rotary axes, such as 4- and 5-axis CNCs and robot arms, this transformation can be quite complex, with non-linear relationships between the positions, velocities, and accelerations of the tool-tip coordinates and those of the actuator.

The fourth step 716 is an algorithm to check the properties of the segmented trajectory so far generated against machine limits, particularly those for accelerations of the actuators. Each coarse setpoint's velocity, acceleration and possibly higher derivatives are checked against the machine limits. Segment times are increased (and thus velocity and acceleration are decreased) as necessary to ensure that no machine limits are violated.

The fifth step 718 is a "fine interpolation" stage that uses the potentially modified path segment data to create equations of motion specific to each segment and solves these at a higher update rate to generate individual setpoints for each axis.

These setpoints are then used as inputs to the feedback loops for the axes, whose goal is to keep the physical coordinates of each axis as close to the setpoints as possible. The resulting setpoints are transmitted to the control loop in step 720.

Replacing the classic one-stage interpolation algorithm that computes every individual setpoint for each axis directly from the equations for the programmed move with a two-stage algorithm can provide many benefits. In a two-stage algorithm employed in a preferred embodiment of the invention, the initial "coarse" interpolation algorithm solves the programmed move equations at time intervals substantially greater than the servo (or position) update rate, creating small "segments" along the commanded path. The secondary "fine" interpolation algorithm executes a simple algorithm, usually at the servo update rate, to produce intermediate points between the coarse segment points.

In the preferred embodiment, the update for coarse interpolation is in the range of 10-20 servo cycles, but this may vary for different operations, and different stages of a given operation. For instance, more complex contoured shapes may be formed with the coarse interval set for fewer servo update periods.

This two-stage interpolation algorithm conserves computing resources when the motion equations are complex (e.g. circular interpolation or Non-Uniform Rational B-Splines [NURBS]) by not solving these equations at an unnecessarily high rate. Obviously, there is a trade-off between the computational load and path accuracy in this technique, but in most applications the errors introduced by the approximation of the fine interpolation algorithm can be kept to a small percentage of the overall error budget without undue loading of the processor.

In addition, two-stage interpolation conserves computing resources when the underlying machine geometry is complex, as in non-Cartesian mechanisms such a 4- and 5-axis machine tools and robot arms with rotary joints. Accurate control of tool-tip position along a path, even a straight-line path, requires that the "inverse-kinematic" conversion from tool-tip coordinates to the underlying actuator coordinates required to create that tool-tip position be calculated at closely spaced locations along the path. However, solving these often complex equations at every update point along the path can create a huge computational load on the processor. Executing these inverse-kinematic calculations on the intermediate segment points produced by the coarse-interpolation algorithm permits a significant reduction in calculation requirements, while retaining a high level of path accuracy. As with complex motion equations, there is a trade-off between the frequency of these calculations and the resulting accuracy.

Common fine interpolation algorithms are B-splines of various orders. The first-order B-spline (not usually thought of as a spline) produces a chordal approximation to the path with constant-velocity segments, providing what is known as $C^0$ continuity—continuity of position only from one segment to the next. The second-order B-spline produces a curved path with constant-acceleration segments, providing $C^1$ continuity—continuity of direction and therefore of velocity from one segment to the next. The third-order B-spline also produces a curved path, using segments with constant rate of change of acceleration ("jerk"), but with $C^2$ continuity—continuity of curvature as well as direction, and therefore of acceleration as well as velocity, from one segment to the next. At least second or third-order interpolation must be used in this technique to satisfy the requirements of modern users.

The limited errors introduced by third-order B-spline fine interpolation can be expressed as:

$$E_s = V^2 T_s^2 / 6R$$

where $T_s$ is the coarse-interpolation, or "segment" time. While similar in form to the post-filter acceleration error term, because $T_s$ is so much smaller than $T_f$ (typically a few milliseconds instead of hundreds of milliseconds), the size of these errors is several orders of magnitudes smaller, and usually insignificant.

The step between the coarse and fine interpolation stages (and after any inverse-kinematic transformations) is an excellent stage of the process at which to apply algorithms that check the trajectory against machine limits including position, velocity, acceleration, and even higher derivatives. There are several reasons for this. First, the segment points are close enough together that nothing that happens in between them could cause any subsequent significant violation of a limit established here. Second, the same algorithm can be used on the segments, regardless of the original move type (e.g. linear, circular, parabolic, NURBS).

Third, by operating on segments rather than the original programmed moves, it is possible to divorce acceleration control from the programmed move boundaries. This permits the resulting limited acceleration and deceleration ramps (possibly with higher-derivative control included) to cover multiple programmed moves. It also permits acceleration and deceleration (again possibly with higher-derivative control included) to occur in the middle of long programmed moves, for example to slow down in a linear move before a tight corner starts.

Also, because the limiting algorithm does not have to execute every servo cycle, as the post-interpolation filter must, more sophisticated algorithms can be used at this stage to create more optimal results without unduly burdening the processor. Algorithms with processing times exceeding a servo cycle may be employed without slowing the operation process. It is practical, for example, to control the rate of acceleration directly, and not just introduce an acceleration time constant, yielding more optimal results.

If the limiting algorithm detects that a segment violates a machine limit, it extends the time for that segment just enough so that the limit is no longer violated. (If violation of a position limit is found, the trajectory must be stopped.) Since this slows the trajectory at that point, it creates a deceleration in the trajectory from the previous segment(s) that could potentially violate machine limits. Therefore, the algorithm must work backwards through previously computed segments of the trajectory, extending their times as necessary to provide a deceleration within machine limits to this point.

Since a robust limiting algorithm must look ahead in the trajectory far enough to cover the worst-case stopping distance (as a car's headlights should project ahead the stopping distance), these kinds of algorithms are commonly called "lookahead" algorithms (making them "non-causal" filters.) Because the acceleration control of the preferred embodiment method uses future information, it does not inherently create a lag and path errors as the causal post-filtering does.

If the mechanism is non-Cartesian, yielding a non-linear relationship between tool-tip coordinates and underlying actuator coordinates, there is a further advantage to performing the limiting algorithms at this point, after the inverse-kinematic conversion to actuator coordinates. Because the relationship between the two coordinate frames, and therefore their derivatives, is non-linear, it is difficult to predict in tool-tip coordinates whether and where a commanded tool-tip trajectory will cause violations of machine limits. By comparing the segments generated by the coarse interpolation algorithm and converted to actuator coordinates against the limits of the actuators, the algorithm can robustly and flexibly keep the trajectory within machine limits.

The machine operation speed override is applied at the coarse-interpolation stage. Both the coarse and fine-interpolation stages operate by incrementing a time value each cycle and solving the relevant motion equations for the new time value. As with override in the prior art one-stage interpolation scheme, override is accomplished by varying the numerical time value used from the true physical time applied to the increment of the trajectory. However, more flexibility is possible at the coarse-interpolation stage. At the fine-interpolation stage, the physical time per increment must be constant, because it feeds a fixed-rate control loop. This constraint does not hold at the coarse-interpolation stage.

If this override is applied at the coarse, and not the fine interpolation stage, and the primary higher-derivative (e.g. acceleration) control is applied between the two interpolation stages, this higher-derivative control is independent of the override value. Furthermore, because acceleration control implemented this way can set the rate, and not the time constant, of the acceleration, the rate of acceleration is maintained as override changes, producing a more time-optimal result than either prior-art method. And all of this is further accomplished without the acceleration control changing the commanded path.

Figure 4:
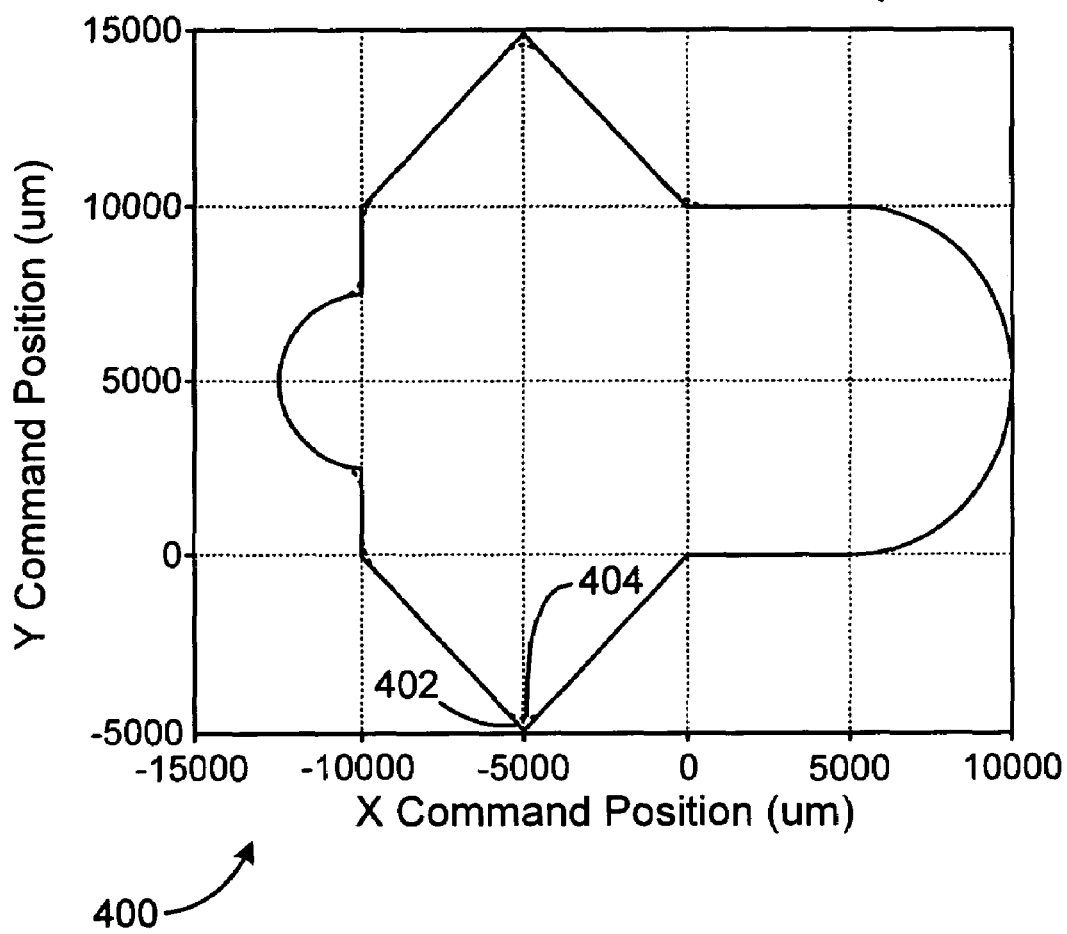
Figure 5:
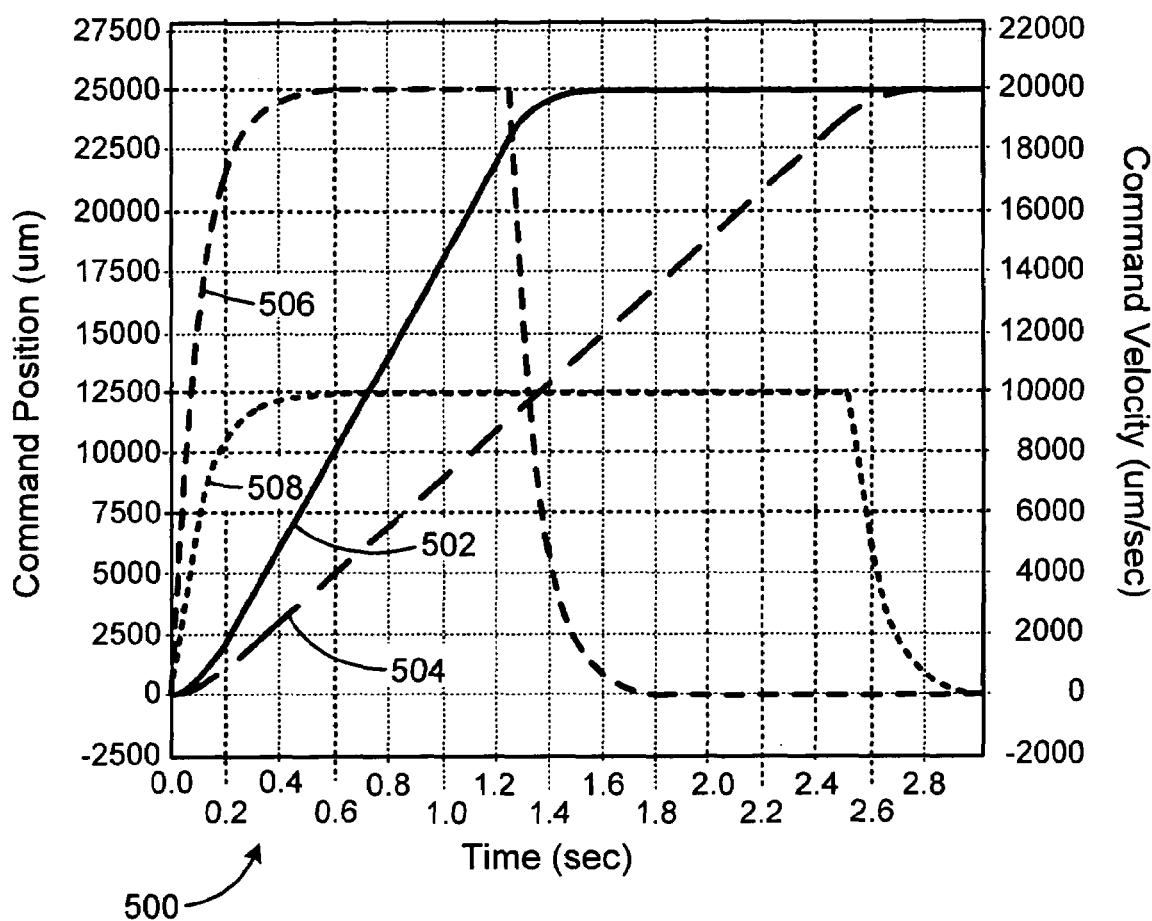
Figure 6:
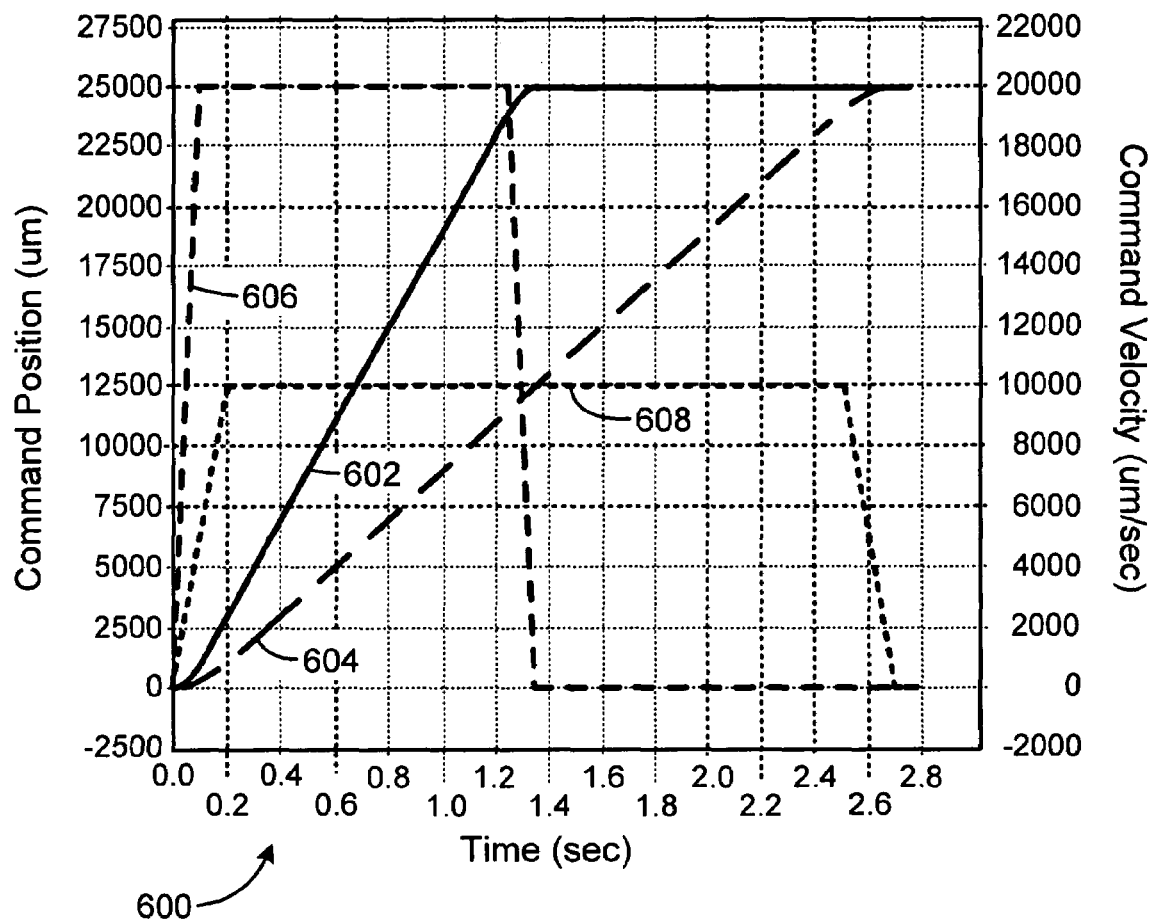

In the preferred embodiment approach, there still is value in permitting acceleration control at the move-equation calculation time, as this sets the size of corners in blending non-tangent moves together as seen in FIG. 4. The corner rounding starts and ends a distance $F*T_\alpha/2$ from the corner point, where F is the programmed vector feedrate, and $T_\alpha$ is the programmed acceleration time. The programmed size of the corners will dictate how much slowing at the corners the lookahead acceleration-control algorithm will produce. Smaller (tighter) corners will require more slowing (if any is needed) than larger corners do. This enables the selection of a preferred trade-off between corner sharpness and operation speed.

Because the override is applied before the lookahead acceleration-control algorithms, and because the lookahead algorithms must of necessity buffer the motion sequence for the length of the lookahead, there will be a delay in implementing changes in the override value for the length of the lookahead buffer, when compared to override executed at the fine-interpolation stage. But this is essential in any technique to maintain proper acceleration control as override changes.

Figure 1:
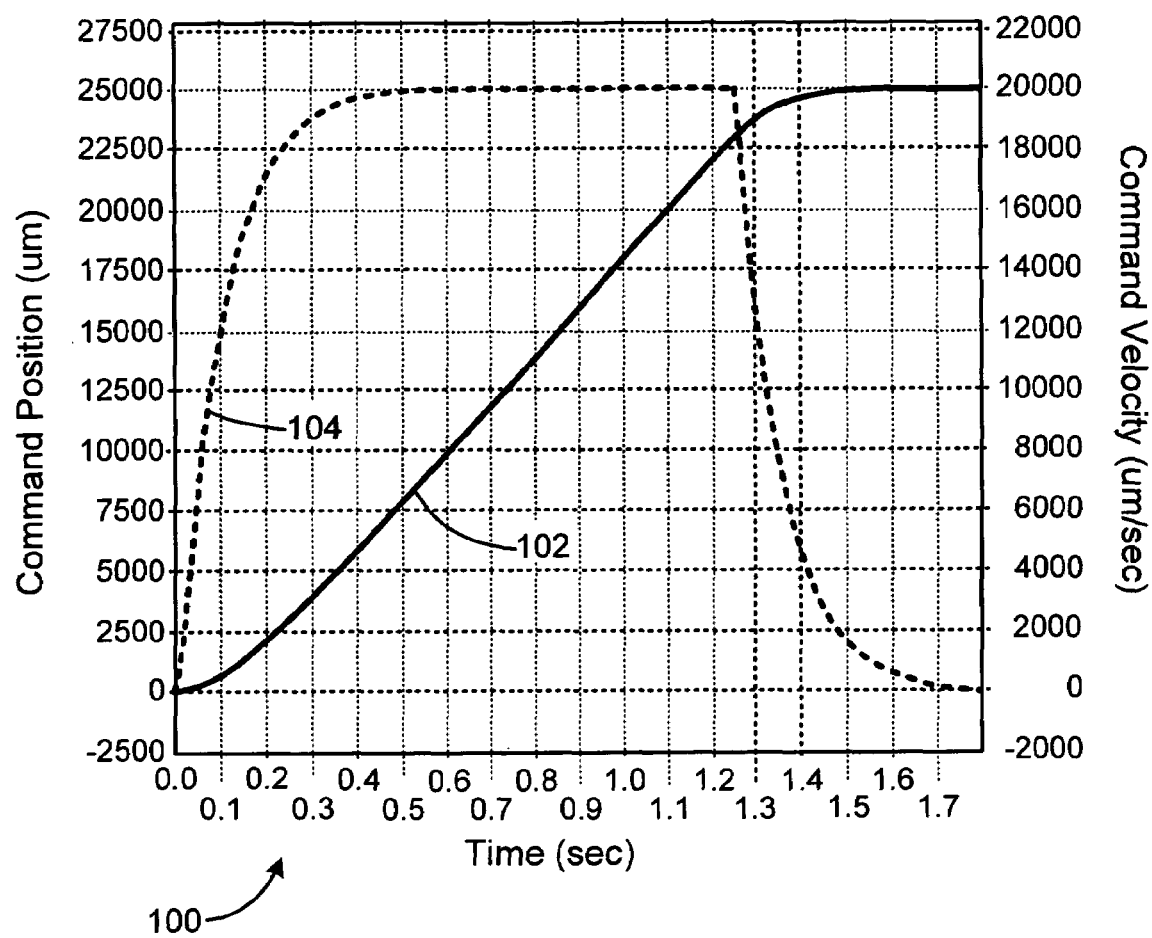
FIGS. 1-6 are graphs illustrating operation of prior art systems.
Figure 2:
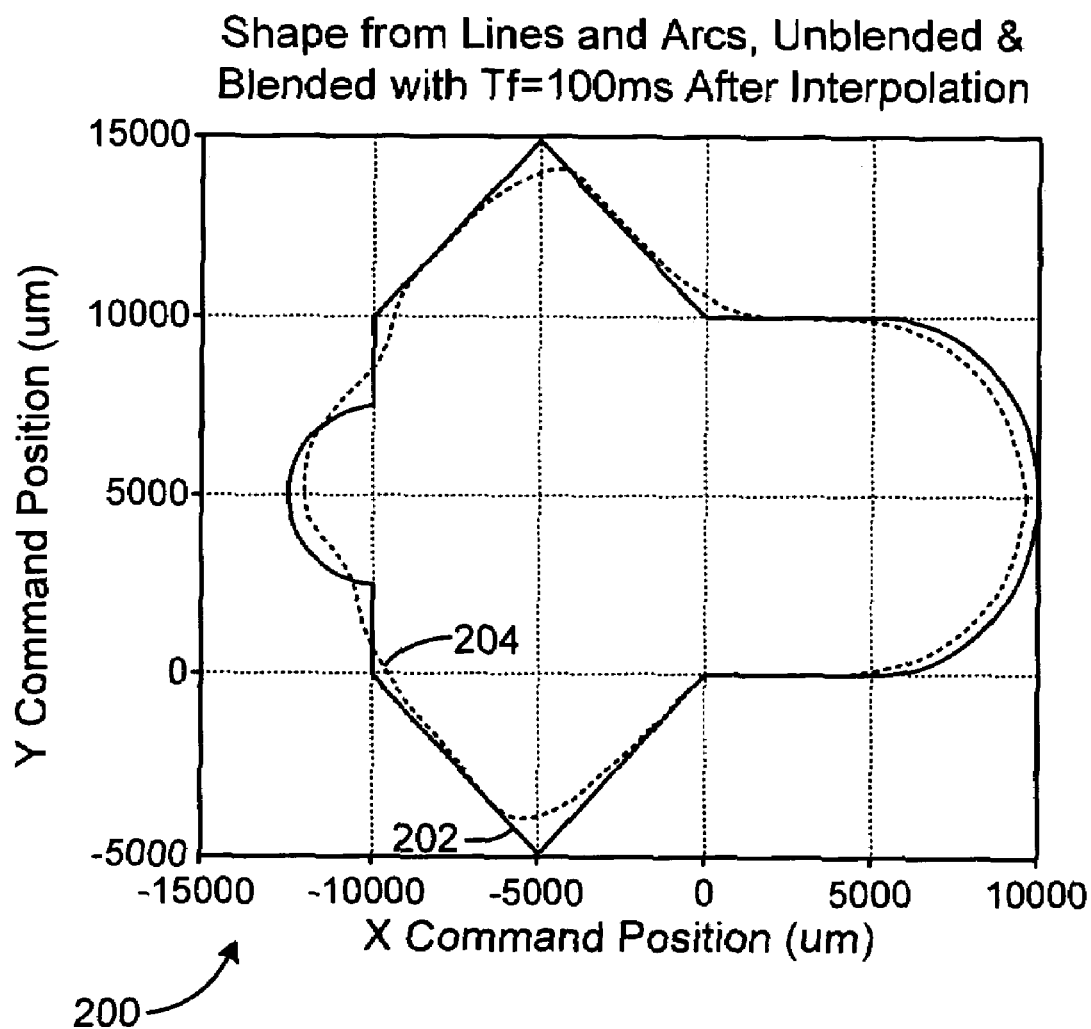
Figure 3:
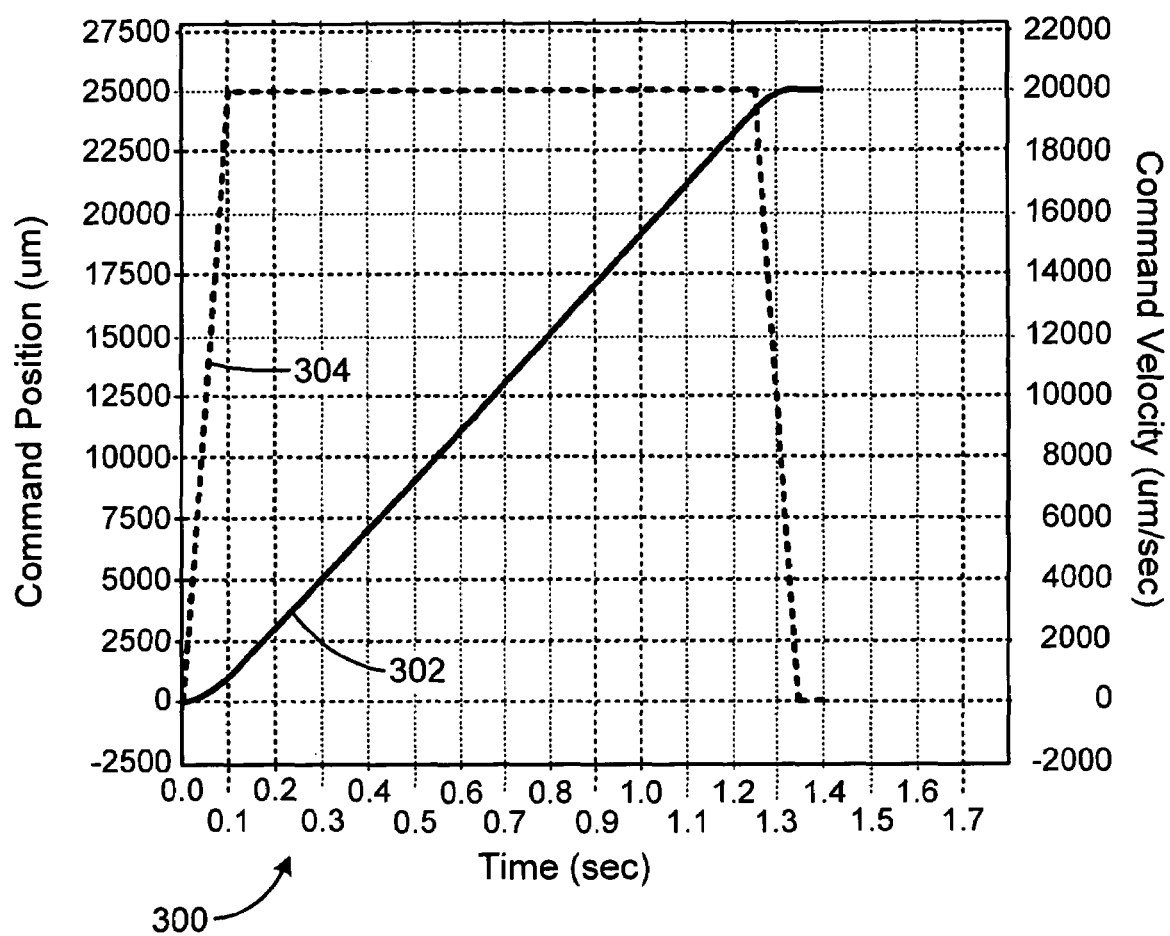
Figure 7:
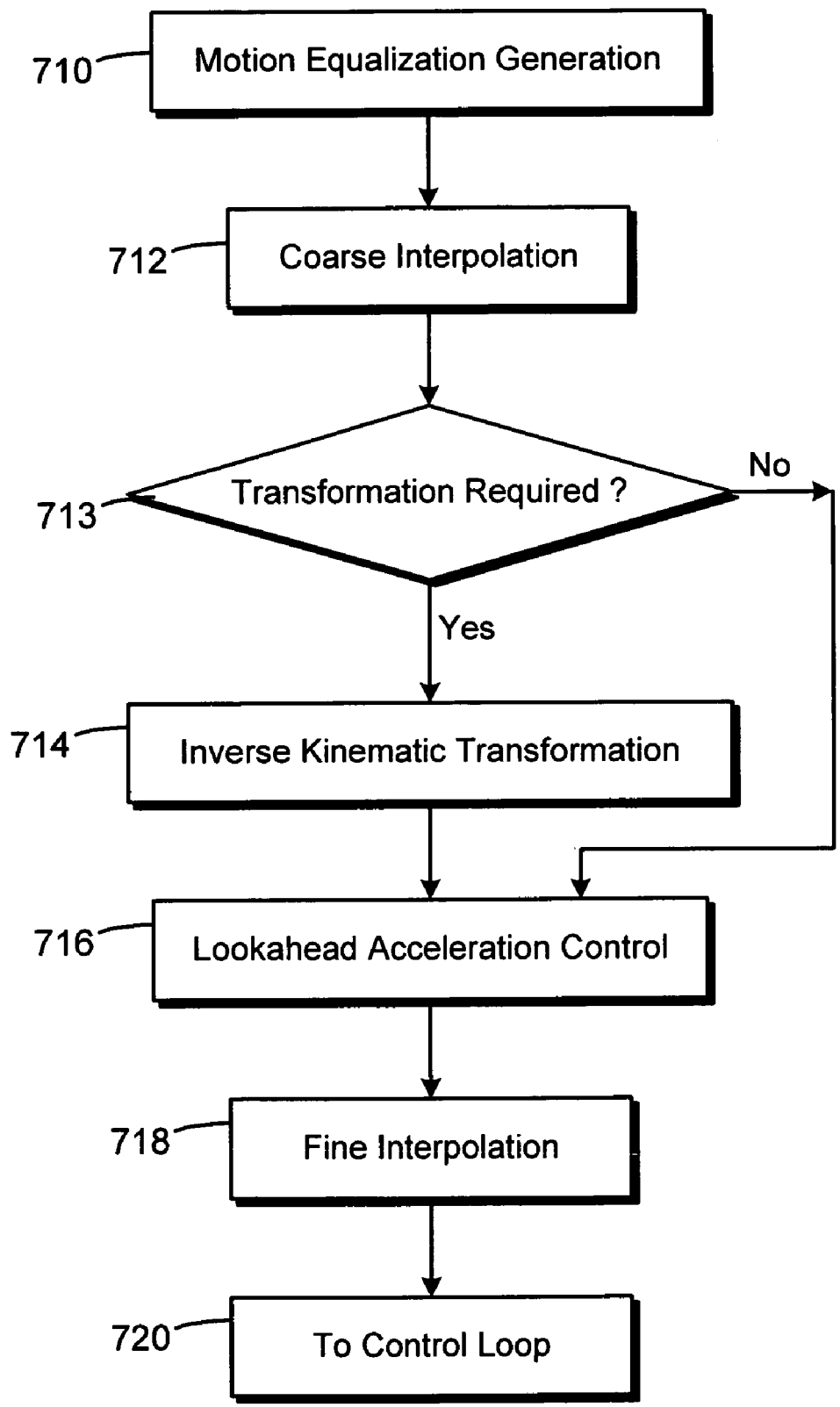
FIG. 7 is a block diagram illustrating the steps of operation of the preferred embodiment.

FIG. 7 shows a graph 730 illustrating the X-axis velocity profiles for the right part of the shape of FIGS. 2 and 4, executed with 100% (line 732) and 50% (line 734) override values applied at the coarse interpolation stage, with acceleration control applied between the interpolation stages.

A "G-Code" program written according to the RS-274 standard to produce this path is shown below (with explanatory comments after the semicolons):

| | |
|---|---|
| G90 | ; Absolute move mode |
| G17 | ; Specify XY plane for circular arcs |
| G92 X0 Y0 | ; Set present position to (0,0) |
| F20 | ; Set feedrate (tool speed) of 20 mm/sec |
| G01 | ; Linear interpolation mode |
| X5 Y0 | ; Straight-line move to (5,0) |
| G03 | ; Counterclockwise circle mode |
| X5 Y10 J5 | ; Arc move to (5,10) around (5,5) |
| G01 | ; Linear interpolation mode |
| X0 Y10 | ; Straight-line move to (0,10) |
| G04 P2 | ; Dwell for 2 seconds |

The axes are programmed in millimeters (while the units in FIG. 7 are in microns). The acceleration limits for both axes are 50 mm/sec$^2$.

As shown, the rate of acceleration to and from stop is identical at both override values. At 100%, the centripetal acceleration of the arc move exceeds motor limits, so it cannot execute at the programmed feedrate anywhere along the arc. Because tangent acceleration along the path is also subject to the motor limits, the linear moves must be slower as they blend with the arc move. The first linear move begins to decelerate before its end, and the second linear move accelerates toward the programmed speed as it leaves the arc. Note that the path is identical in both cases: 50% and 100% override.

The final output of the fine-interpolation algorithm, and so of the entire multi-step trajectory generation algorithm, is a series of commanded positions for each axis. In a closed-loop digital servo-system implementation (presently the most common style of implementation), the numerical values for these commanded positions are compared mathematically to numerical values for actual position derived from feedback sensors, with feedback and feedforward algorithms being applied to keep the difference between commanded and actual values as small as possible.

In a closed-loop analog servo-system implementation (e.g. galvanometer-controlled laser marking and cutting systems), the numerical values for these commanded positions are converted to analog command signals and compared to analog signals representing actual position derived from feedback sensors, with analog circuitry closing the feedback loop.

In an open-loop stepper-motor implementation, the numerical values for these commanded positions are used to set the orientation of the magnetic field to be created by the phase currents in the stator of each axis' stepper motor. This stator field reacts with the rotor's magnetic field so as to pull the rotor towards alignment with the stator field.

Implementing a two-stage interpolation algorithm for executing programmed move paths, with override control implemented at the first, coarse, interpolation stage, and non-causal acceleration control implemented between the two interpolation stages, provides accurate paths in a time-optimal manner. It provides the following advantages:

Acceleration or higher-derivative control causes no path changes.

Acceleration and higher-derivative control can be applied by rate limiting, not just by time constant yielding more time-optimal trajectories under machine constraints.

Override control causes no path changes.

Override control causes no acceleration or higher-derivative changes.

Override control changes are implemented as quickly as possible while maintaining acceleration and higher-derivative control.

Figure 9:
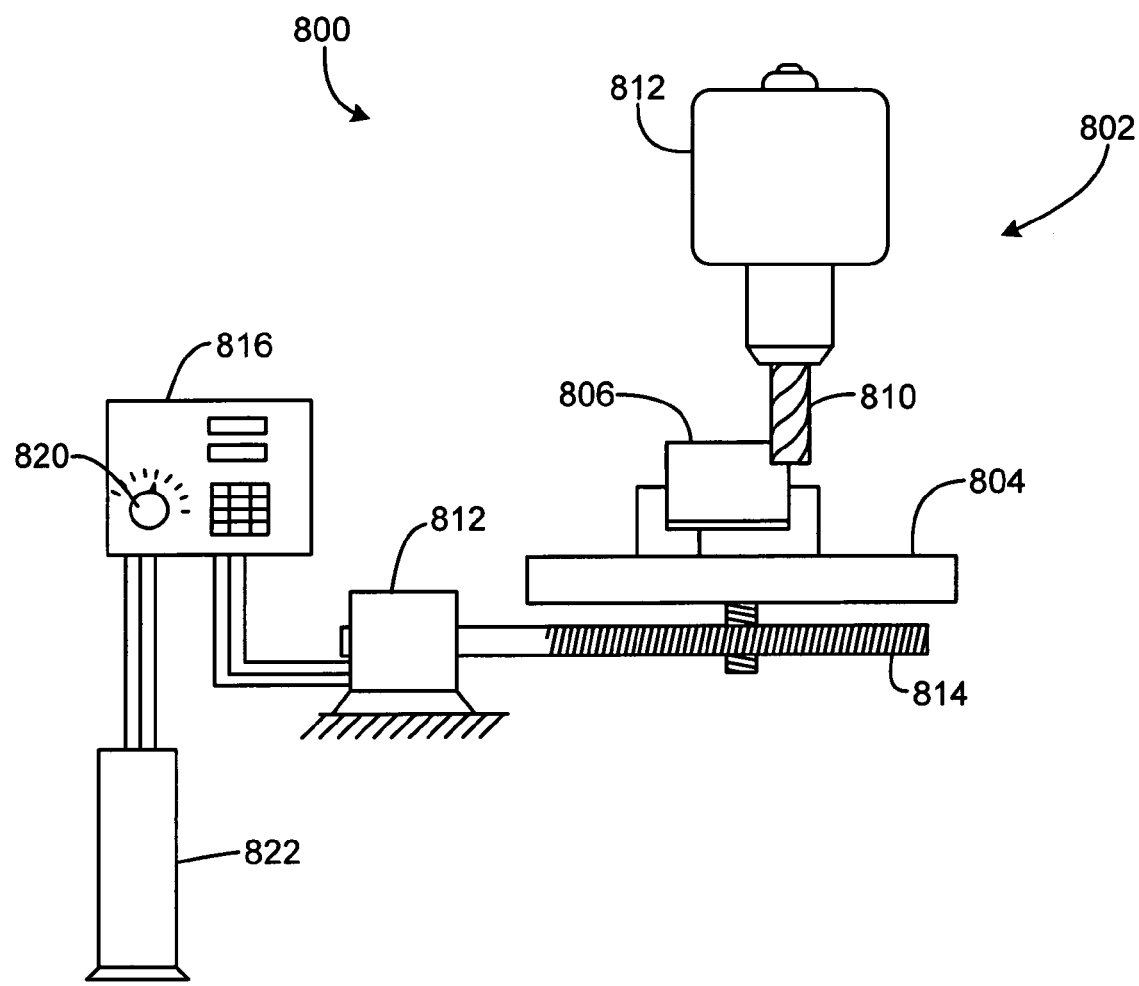
FIG. 9 is a simplified diagram of a system in which the preferred embodiment operates.

A typical system for use with the preferred method of operation occurs in a system 800 shown in FIG. 9. The system includes a CNC machine 802 having a movable table 804 carrying a workpiece 806. A machine tool 810 connected to a motor spindle 812 operates to shape the workpiece. The table is movable on multiple axes, with a mechanism to move it on one axis being shown. A positioning motor 812 has a threaded shaft 814 that engages the table, such that the position of the table is determined by the number of rotations of the shaft 814. The motor 812 is controlled by a controller 816 that is shown in simplified format, and which may include a conventional computer keyboard and display. The controller includes an override control 824 a machine operator to adjust the speed of the machine's operation. The controller includes a computer server 822, for storing a program, and making ongoing calculations according to the process described above.

Many variants of this system are possible, as the invention is independent of the mechanics of the system used to produce the relative motion between the tool and the workpiece. Direct-drive linear motors may be used instead of rotary motors driving a screw. Rotary axes may be added to either the table, the tool holder, or both, to control the relative orientation as well as position. Complex, non-Cartesian mechanisms may be used to create the relative positioning and orientation between tool and workpiece.

The invention claimed is:

1. A method of generating a controlled motion path by an automated system having a controller operating at a servo rate, the method comprising:
   engaging in a first interpolation step, in which a path segment corresponding to a plurality of servo update periods is calculated;
   establishing a speed override factor; and
   after establishing a speed override factor, engaging in a second interpolation step, including calculating a plurality of path setpoints for each path segment.

2. The method of claim 1 wherein each setpoint corresponds to a servo update period.

3. The method of claim 1 wherein the number of servo update periods per path segment varies over the path.

4. The method of claim 1 wherein the number of servo update periods per path segment is in the range of 10 to 20.

5. The method of claim 1 wherein the step of engaging in a first interpolation step includes operating the system with parameters based on the characteristics of a portion of the path not yet followed.

6. The method of claim 1 wherein the path has a plurality of path shape portions, and wherein each path shape portion includes a plurality of the path segments.

7. The method of claim 6 including engaging in a plurality of the first interpolation steps for each path shape portion.

8. The method of claim 1 including, after engaging in the first interpolation step, transforming the path segment data produced in the first interpolation step from tool tip coordinates to coordinates of a mechanism employed by the automated system.

9. The method of claim 1 including, after engaging in the first interpolation step, comparing the segment data produced in the first interpolation step against a machine limit for a parameter selected from the group of parameters comprising position, velocity, acceleration, and higher derivatives, and in response to a violation of the limit for a segment, automatically extending the time of the segment.

10. A computer-controlled automated positioning system comprising:
    a frame supporting an automated machine tool in movable relation to a workpiece;
    a position control actuator operable to generate controlled relative movement between the tool and the workpiece;
    a controller operably connected to the position control actuator;
    the controller operable at a position update rate;
    the controller being operable to engage in a first interpolation step, in which a path segment corresponding to a plurality of position update periods is calculated;
    the controller establishing a speed override factor; and
    after establishing a speed override factor, the controller engaging in a second interpolation step, including calculating a plurality of path setpoints for each path segment.

11. The system of claim 10 wherein each setpoint corresponds to a position update period.

12. The system of claim 10 wherein the number of position update periods per path segment varies over the path.

13. The system of claim 10 wherein the number of position update periods per path segment is in the range of 10 to 20.

14. The system of claim 10 wherein the step of engaging in a first interpolation step includes operating the system with parameters based on the characteristics of a portion of the path not yet followed.

15. The system of claim 10 wherein the path has a plurality of path shape portions, and wherein each path shape portion includes a plurality of the path segments.

16. The system of claim 15 including engaging in a plurality of the first interpolation steps for each path shape portion.

17. The system of claim 15 wherein the controller is operable, after engaging in the first interpolation step, to transform to a non-Cartesian coordinate system.

18. The system of claim 10 wherein the controller is operable, after engaging in the first interpolation step, to transform the path segment data produced in the first interpolation step from tool tip coordinates to coordinates of a mechanism employed by the automated system.

19. The system of claim 10 wherein the controller is operable, after engaging in the first interpolation step, comparing the segment data produced in the first interpolation step against a machine limit for a parameter selected from the group of parameters comprising position, velocity, acceleration, and higher derivatives, and in response to a violation of the limit for a segment, automatically extending the time of the segment.

* * * * *